(12) United States Patent
Kalyan

(10) Patent No.: US 6,266,655 B1
(45) Date of Patent: Jul. 24, 2001

(54) COMPUTER-IMPLEMENTED VALUE MANAGEMENT TOOL FOR AN ASSET INTENSIVE MANUFACTURER

(75) Inventor: Vibhu K. Kalyan, Dallas, TX (US)

(73) Assignee: i2 Technologies, Inc., Irving, TX (US)

( * ) Notice: Subject to any disclaimer, the term of this patent is extended or adjusted under 35 U.S.C. 154(b) by 0 days.

(21) Appl. No.: 09/359,175

(22) Filed: Jul. 22, 1999

Related U.S. Application Data

(60) Provisional application No. 60/093,709, filed on Jul. 22, 1998.

(51) Int. Cl.[7] ..................................................... G06F 17/60
(52) U.S. Cl. ........................... 705/400; 700/99; 700/100; 705/8
(58) Field of Search .......................... 700/99, 100; 705/1, 705/7, 8, 10, 400

(56) References Cited

U.S. PATENT DOCUMENTS

| | | | |
|---|---|---|---|
| 4,887,206 | * 12/1989 | Natarajan | 705/29 |
| 5,063,506 | * 11/1991 | Brockwell et al. | 705/7 |
| 5,140,537 | * 8/1992 | Tullis | 703/6 |
| 5,249,120 | * 9/1993 | Foley | 705/1 |
| 5,287,267 | 2/1994 | Jayaraman et al. | 364/403 |
| 5,715,165 | 2/1998 | Luh et al. | 364/474.15 |
| 5,826,236 | * 10/1998 | Narimatsu et al. | 705/8 |
| 5,953,711 | * 9/1999 | Ishizuka | 705/400 |
| 5,960,417 | * 9/1999 | Pan et al. | 705/400 |
| 6,032,123 | * 2/2000 | Jameson | 705/8 |
| 6,167,380 | * 12/2000 | Kennedy et al. | 705/10 |

FOREIGN PATENT DOCUMENTS

| | | |
|---|---|---|
| 5-189449 | * 7/1993 | (JP) . |
| WO 99/26168 | 5/1999 | (WO) . |

OTHER PUBLICATIONS

Narahari et al: "Real–world extensions to scheduling algorithms based on Lagrangian relaxation"; Sadhana–Academy Proceddings in Engineering Sciences; Aug. 4, 1996, v 21, n pt, pp. 415–433 (Abstract Only).*

LeBlanc: "Formulating and solving production planning problems"; European Journal of Operational Research; Jan. 1, 1999, v112 n1, pp. 54–80, (Abstract Only).*

Lashkari et al: "A Lagrangean Relaxation Approach to Machine Allocation in Cellular Manufacturing Systems"; Computers & Industrial Engineering; v19 n1–4, pp442–446 (abstract only).*

Lashkari et al: "Tagrangean relaxation approach to machine allocation in cellular manufacturing systems"; Computers & Industrial Engineering; v19 n1–4, pp442–446 (abstract only).*

Lashkari et al: "Machine allocation in cellular manufacturing systems: An application of Lagrangian relaxation"; Canadian Journal of Administrative Sciences=Revue Canadienne des Sciences de l'Adminstration; v9 n4 pp. 336–334; Dec. 1996 (abstract).*

Lee: "An algorithm for a two–staged distribution system with various types of distribution centers"; v34 n2 pp. 105–117; May 1996.*

Tomastik et al: "Scheduling flexible manufacturing systems for apparel production"; IEEE Transactions on Robotics and Automation, vol. 12 No. 5, pp. 789–799 (abstract only).*

Van Brussel et al: "A conceptual framework for holonic manufacturing: Identification of manufacturing holons"; Journal of Manufacturing Systems, v18 n1, pp. 35–52.*

* cited by examiner

Primary Examiner—Edward R. Cosimano
(74) Attorney, Agent, or Firm—Baker Botts L.L.P.

(57) ABSTRACT

A method of valuing resources of an asset intensive manufacturer. Calculations provide a MAV for each resource (machine) for each time horizon. The inputs for the calculations include the prices of products made by the resource, probalistic demand for the products, usage of the resource by various products, and availability of the resource. A series of equations, one equation associated with each resource, is formulated and solved, using lagrangian methods, with lagrangian multipliers representing resource values.

31 Claims, 5 Drawing Sheets

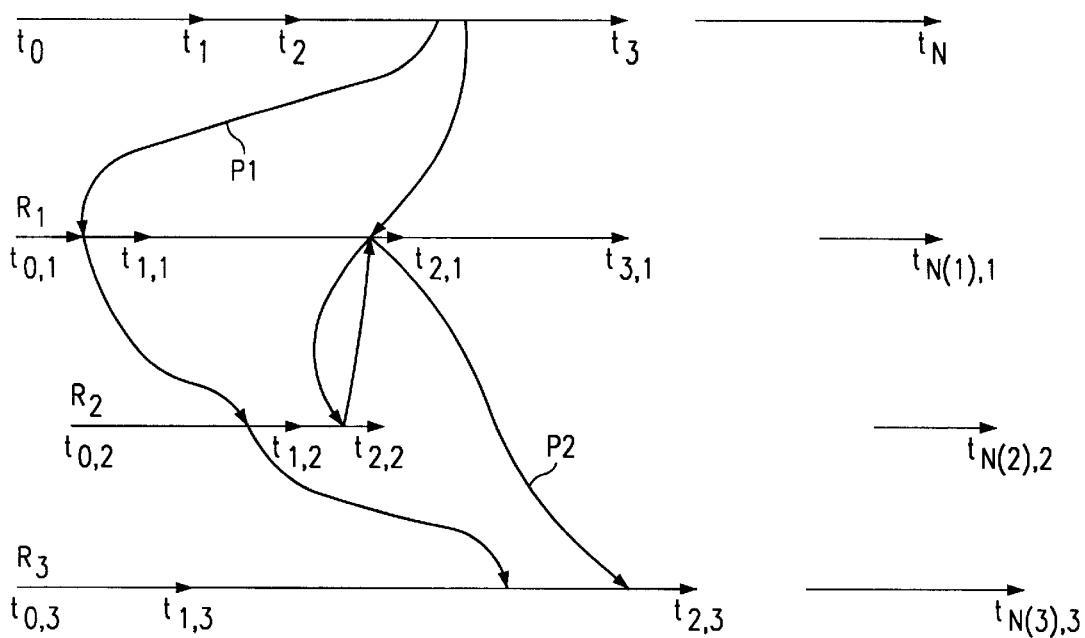

COST DATA ($/UNIT)

$C_1=5$, $C_2=3$, $C_3=5$, $C_4=7$, $C_5=1$, $C_6=1$, $C_7=1$, $C_8=1$, $C_9=1$, $C_{10}=1$

PRICE DATA ($/UNIT)

$S_1=7$, $S_2=5$, $S_3=10$, $S_4=9$, $S_5=3$, $S_6=2.3$, $S_7=5$, $S_8=6$, $S_9=3$, $S_{10}=4.5$

YIELD DATA $Y_1=.9$, $Y_2=.95$, $Y_3=.9$, $Y_4=.95$, $Y_5=1$, $Y_6=1$, $Y_7=1$, $Y_8=1$, $Y_9=1$, $Y_{10}=1$

VALUE (DERIVED FROM ABOVE AS $/UNIT) ($V_k = S_k Y_k - C_k$)

$$U_1^1(u_1+\sigma_1 Q^{-1}(\lambda_1/V_1^1 Q(-u_1/\sigma_1)))+U_1^3(u_3+\sigma_3 Q^{-1}(\lambda_1/V_3^1 Q(-u_3/\sigma_3)))$$
$$U_1^5(u_5+\sigma_5 Q^{-1}(\lambda_1/V_5^1 Q(-u_5/\sigma_5)))-T_1=0$$

$$U_2^1(u_1+\sigma_1 Q^{-1}(\lambda_2/V_1^2 Q(-u_1/\sigma_1)))+U_2^2(u_2+\sigma_2 Q^{-1}(\lambda_2/V_2^2 Q(-u_2/\sigma_2)))$$
$$U_2^6(u_6+\sigma_6 Q^{-1}(\lambda_6/V_6^2 Q(-u_6/\sigma_6)))-T_2=0$$

$$U_3^3(u_3+\sigma_3 Q^{-1}(\lambda_3/V_3^3 Q(-u_3/\sigma_3)))+U_3^4(u_4+\sigma_4 Q^{-1}(\lambda_3/V_4^3 Q(-u_4/\sigma_4)))$$
$$U_3^7(u_7+\sigma_7 Q^{-1}(\lambda_7/V_7^3 Q(-u_7/\sigma_7)))-T_3=0$$

$$U_5^1(u_1+\sigma_1 Q^{-1}(\lambda_5/V_1^5 Q(-u_1/\sigma_1)))+U_5^2(u_2+\sigma_2 Q^{-1}(\lambda_5/V_2^5 Q(-u_2/\sigma_2)))$$
$$U_5^8(u_8+\sigma_8 Q^{-1}(\lambda_8/V_8^5 Q(-u_8/\sigma_8)))-T_5=0$$

$$U_6^3(u_3+\sigma_3 Q^{-1}(\lambda_6/V_3^6 Q(-u_3/\sigma_3)))+U_6^9(u_9+\sigma_9 Q^{-1}(\lambda_9/V_9^6 Q(-u_9/\sigma_9)))-T_6=0$$

$$U_8^4(u_4+\sigma_4 Q^{-1}(\lambda_8/V_4^8 Q(-u_4/\sigma_4)))+U_8^{10}(u_{10}+\sigma_{10} Q^{-1}(\lambda_{10}/V_{10}^8 Q(-u_{10}/\sigma_{10})))-T_8=0$$

FIG. 6

| RESOURCE | MAV ($/UNIT OF RESOURCE) |
|---|---|
| 1 | 1.0671E-3 |
| 2 | .16913 |
| 3 | 1.059E-3 |
| 5 | .14657 |
| 6 | 1.3234 |
| 8 | .38312 |

| PRODUCT | ALLOCATION | VALUES ($) | PERTURBED ALLOCATIONS | VALUES ($) |
|---|---|---|---|---|
| 1 | 3.5482 | 4.5965 | 3.5482 | 4.5965 |
| 2 | 10.222 | 15.601 | 10.222 | 15.601 |
| 3 | 1.8852 | 7.5205 | .8852 | 3.5366 |
| 4 | 8.0926 | 12.526 | 8.0926 | 12.526 |
| 5 | 34.638 | 30.21 | 34.638 | 30.21 |
| 6 | 13.376 | 12.75 | 13.376 | 12.75 |
| 7 | 47.728 | 80.562 | 52.728 | 80.564 |
| 8 | 37.13 | 109.91 | 37.13 | 109.91 |
| 9 | 10.345 | 18.912 | 13.345 | 22.006 |
| 10 | 25.63 | 58.716 | 25.63 | 58.716 |
| TOTAL VALUE | | 351.3 | | 350.41 |

*FIG. 8B*
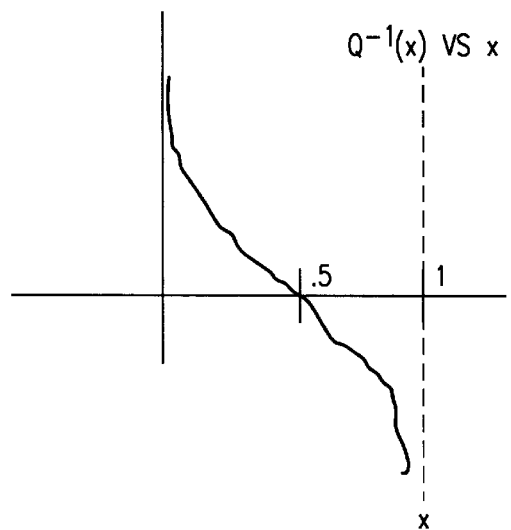
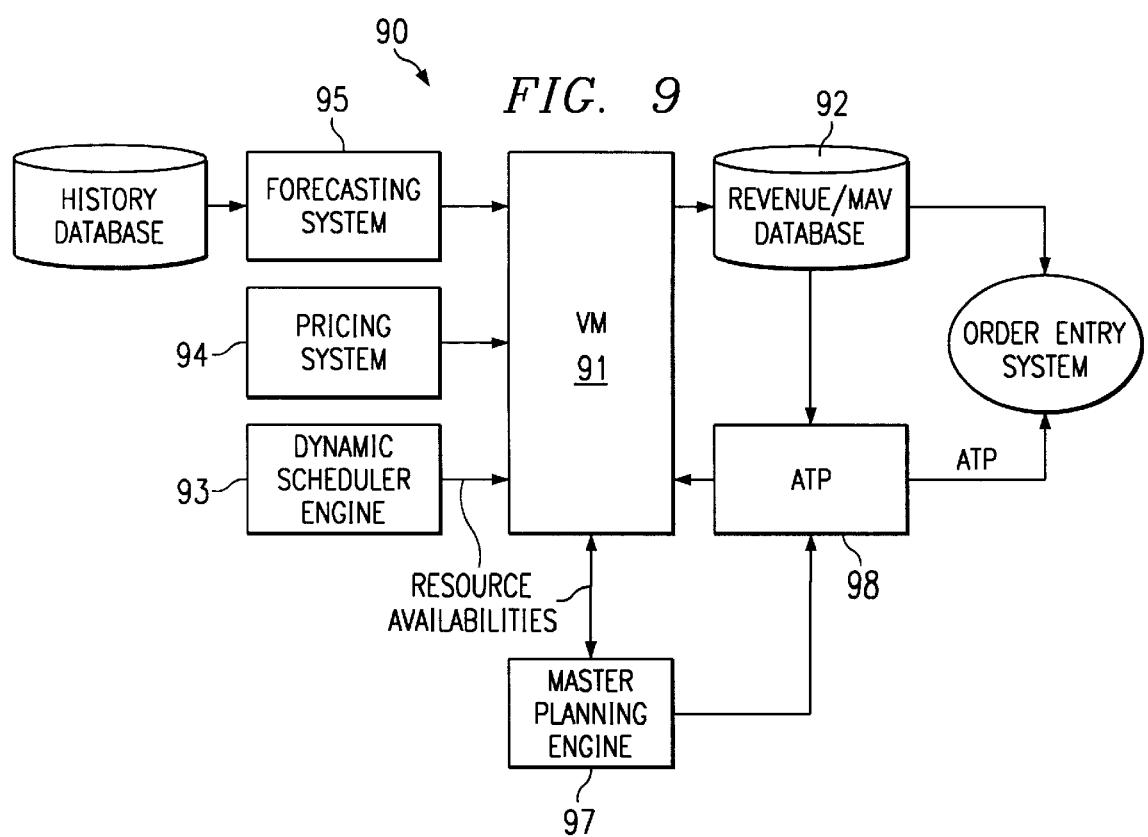
*FIG. 9*

COMPUTER-IMPLEMENTED VALUE MANAGEMENT TOOL FOR AN ASSET INTENSIVE MANUFACTURER

RELATED PATENT APPLICATION

This application claims the benefit of U.S. provisional application No. 60/093,709, filed Jul. 22, 1998, and entitled "Computer Implemented Method and System for Value Management Problem Formulation for an Asset Intensive (AI) Manufacturer".

TECHNICAL FIELD OF THE INVENTION

This invention relates to computer-implemented enterprise management tools, and more particularly to a computer-implemented method of calculating resource values for an asset intensive manufacturer.

BACKGROUND OF THE INVENTION

One of the unique challenges of any manufacturing enterprise is valuation of its products and resources. In the case of product valuation, traditionally, prices are computed on the basis of a cost-plus measure and some measure of the ability of the customer to pay. Resources are conventionally valued in terms of prices paid for them, for example, the price paid for a machine used to make products.

In recent years, computer-implemented enterprise management tools have been developed to assist in management decisions. These tools often include pricing tools, intended to assist in the valuation process.

Notable among product pricing tools are those especially developed for airlines. These tools are not necessarily suitable for manufacturers. For example, material intensive manufacturers have limited materials (components) rather than capacity. In contrast, asset intensive manufacturers have limited resource capacity and demand may be serviced before desired. In both cases, probabilistic demand is not in a particular order for different prices, as is the case with airline travel.

SUMMARY OF THE INVENTION

One aspect of the invention is a method of valuing resources used to manufacture products. The method is especially useful for asset intensive manufacturers, who have limited capacity on their resources. The manufacturing process is modeled in terms of time periods, resources used during each time period, and products made by the resources. From this information, a usage value for each product per resource and an availability value for each resource can be determined. Additional input data parameters are the profit and allocation for each product. A probabilistic demand function is used to represent expected demand for each product. Given these values and the demand function, a value equation is formulated for each resource. Each value equation is expressed as a agrangian equation having a lagrange multiplier that represents the resource value. The equations are then solved for the lagrange multiplier to obtain a value for each resource.

BRIEF DESCRIPTION OF THE DRAWINGS

FIG. 1 illustrates how time periods, products, and resources of an asset intensive manufacturer are modeled for purposes of the invention.

FIG. 2 illustrates an example of time periods, products, and resources of an asset intensive manufacturer.

FIG. 5 illustrates the MAV equations for the example of FIG. 2.

FIG. 6 illustrates the solutions of the MAV equations of FIG. 5.

FIG. 7 illustrates the solution to the example problem in terms of allocations and expected revenues.

FIGS. 8A and 8B illustrate Q and $Q^{-1}$ functions, respectively.

FIG. 9 illustrates how a MAV calculation engine may be integrated into a larger product planning and scheduling system.

DETAILED DESCRIPTION OF THE INVENTION

Figures 3, 4:
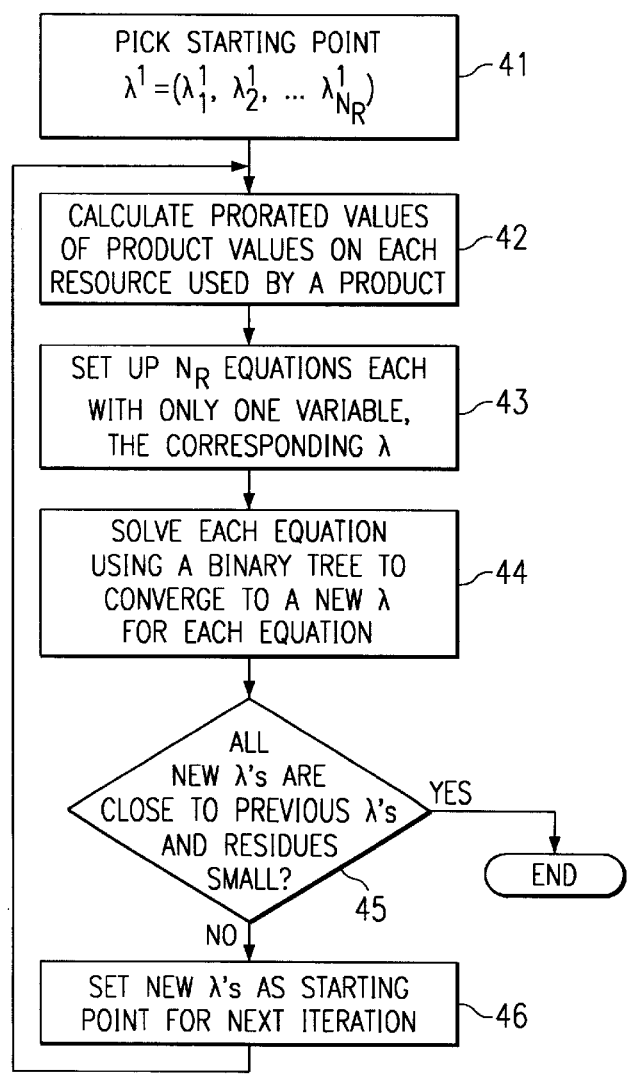
FIG. 3 illustrates additional problem data for the example of FIG. 2.
FIG. 4 illustrates how MAV equations are set up and solved.

The following description is directed to a computer-implemented tool that implements a "value management" (VM) pricing method. The tool is designed especially for use by asset intensive manufacturers.

U.S. Pending patent application Ser. No. 09/195,332, entitled "Computer-Implemented Product Valuation Tool", filed Nov. 18, 1998, describes value management in general, and the concept of MAVs (minimum acceptable values). It further describes how MAVs may be differently calculated depending on the type of enterprise and its primary manufacturing constraints. For example, certain manufacturers, such as those that make high tech computer equipment, may be primarily constrained by availability and price of components. Other manufacturers may be primarily constrained by varying lead times. Still other manufacturers are make-to-order manufacturers, who are set up for low inventories and lead times. U.S. Pending patent Ser. No. 09/195,332 describes MAV calculations for each of these types of manufacturers, and is incorporated by reference herein.

General Principles

Value management applied to asset intensive manufacturers requires special considerations. Asset intensive manufacturing is characterized by limited capacity. Demand may be serviced before desired. Demand is not in any particular order for different price ranges, unless a premium is charged for shorter lead times or a discount is given for longer lead times.

An example of an asset intensive manufacturing is steel manufacturing. A primary constraint is machine capacity, as opposed to availability of raw materials. If demand is high, production is most likely to be limited by insufficient machine capacity rather than by other constraints.

Value management for asset intensive manufacturing is based on the following principle: Based on future uncertain demand for various products, expected prices for those products, and available capacities of resources during periods required to supply demand when demanded, a value for each resource during those periods can be calculated. The calculation results in threshold prices, referred to as minimum acceptable values (MAVs) for a given demand period.

For an asset intensive manufacturer, the MAV of a resource monotonically deceases with increase in availability. As machine usage increases, each consumed unit is more expensive (assuming limited availability).

FIG. 1 illustrates time intervals (t0,t1) . . . (tn−1, tn) for which MAVs are to be computed. These intervals may represent seasons in which demands and/or prices for products are significantly different from those in other time intervals, even though the products may be the same. For simplification of example herein, it is assumed that the time intervals are the same for all products, but in practice that may not be the case.

Three resources are designated as R1, R2, and R3. Two products are designated as P1 and P2. Product P1 uses R1 during interval (t01,t11), R2 during (t02,t12), and R3 during (t13,t23). A resource may be used again in another time interval by the same product. Different products or the same product in different demand time periods may compete for the same resource by using a resource during the same time interval. It is this competition for the same resource that determines the value of the resource in each time period.

Pertinent to the manufacturing scenario of FIG. 1 is that the actual demand on the resources by the products takes place in time periods earlier than the period of demand. The demand could be much earlier for some resources, depending on the lead time. Many manufacturing enterprises use computer-implemented models and schedulers to map the product demand in a time period to the appropriate time period of usage of a resource.

As indicated above, solving the valuation problem involves determining the value of each resource (machine). It should be noted that a physical item demanded in one time period is considered as a separate product from the same item demanded in another time period. The prices for these same items in different time periods may also be different. Similarly, a resource in one time period is different from the same resource in another time period.

Let there be Np products denoted by $P_1, P_2 \ldots P_{N_P}$. Indices 1 thru $N_p$ may be used to denote the products and the context will make that clear. Similarly there are $N_R$ resources $R_1, R_2 \ldots RN_R$, and indices 1 thru $N_R$ may be used to denote them. The following parameters are used to formulate the problem:

- $S_i^P$ = set of products using resource i
- $S_j^R$ = set of resources used by product j
- $U_i^j$ = usage of resource i by product j
- $a_j$ = allocation for product j
- $T_i$ = available time (capacity) of resource i
- $s_j$ = price charged (or revenue) per unit of product j
- $c_j$ = cost per unit of product j
- $y_j$ = yield for product j
- $f_j(x)$ = probability density function of demand for product j
- $Pr(x \geq a)$ = probability that random variable x is greater than or equal to a
- $v_j$ = value (profit) per unit from sale of product j
- $V_j$ = total expected value from sale of product j
- $V$ = total expected value from sale of all products An example of a suitable allocation is a discrete allocation, such as determined by available-to-promise calculations.

The resource valuation problem may be mathematically stated as:

$$\text{Max} V = \sum_{j=1}^{N_p} v_j, \text{ such that:} \quad (1)$$

$$v_j = y_j s_j - c_j, j = 1, 2, \ldots N_p \quad (2)$$

$$V_j = v_j \int_0^{a_j} x f_j(x) dx + a_j v_j \int_{a_j}^{\infty} f_j(x) dx$$

Equation (1) states that the total time (capacity) consumed by all products using a resource equals the available time (capacity) on that resource. It may be more appropriate to have an inequality ($\leq$), but dummy products can always be defined with zero value to pick up the slack so that equality is as general as an inequality. However, negative slack should not be allowed. If overbooking is used, the capacity used will be the overbooked capacity.

The Lagrangian of the above-stated problem is:

$$V = V - \sum_{i=1}^{N_R} \lambda_i \left( \sum_{j \in S_i^P} a_j U_i^j - T_i \right) \quad (3)$$

where the $\lambda$'s are the Lagrange multipliers, one for each equality constraint in Equation (1).

The necessary conditions (from calculus) are:

$$\partial V' / \partial a_j = \partial V \Big/ \partial_j - \sum_{j \in S_j^R} \lambda_i U_i^j = 0, j = 1, 2, N_p \quad (4)$$

$$\partial v' / \partial \lambda^j = \sum_{j \in S_i^P} (a_j U_i^j) - T_i = 0, j = 1, 2, \ldots N_R \quad (5)$$

where Equation (5) is a restatement of the equality constraints in Equation (1). There are ($N_R + N_P$) equations and same number of variables; thus they can be solved. Due to nonlinearity, a unique solution may not exist. It is interesting to note that the problem is convex. Both the objective function and the constraints are convex.

From Equation (2):

$$\partial V_j / \partial a_j = v_j a_j f_j(a_j) \partial a_j - v_j a_j f_j(a_j) + v_j \int_{a_j}^{\infty} f_j(x) dx \quad (6)$$

$$= v_j \int_{a_j}^{\infty} f_j(x) dx$$

$$= v_j \ Pr \{\text{demand for product } j \geq a_j\}$$

In deriving Equation (6), the result has been repeatedly used from calculus that helps differentiate integrals whose limits may also be (along with the integrand) a function of the variable with respect to which the differentiation is being carried out.

The demand for products can be modeled as one of various known distributions, such as normal or poisson. Whatever the model, it is assumed that the probability term in Equation (6) is defined as a function by G(a) (it is nothing but the complement of the cumulative distribution function (CDF)). More precisely:

$$G(a) = \int_a^{\infty} f(x) dx$$

The inverse function is defined by $G^{-1}(b) = a$, so that $b = G(a)$. Thus from (4) and (6), it follows that:

$$v_j G(a_j) = \sum_{l \in S_i^R} \lambda_i U_i^j \quad (7)$$

$$\Rightarrow a_j = G^{-1}\left[\left(\sum_{l \in S_i^R} \lambda_i U_i^j\right)\right]/v_j$$

Substituting (7) in (5) results in:

$$\sum_{j \in S_i^P} (G^{-1}\left[\left(\sum_{j \in S_i^P} \lambda_i U_i^j / v_j\right)\right])U_i^j = T_i, i = 1, \ldots N_R \quad (8)$$

$$\Rightarrow \sum_{j \in S_i^P} (G^{-1}\left[\lambda_i U_i^j / \left(v_j \lambda_i U_i^j / \left(\sum_{j \in S_i^P} \lambda_1 U_1^j\right)\right)\right])U_i^j = T_i$$

The following expression represents the total prorated value of product j on resource i:

$$v_j \lambda_i U_i^j / \left(\sum_{l \in S_j^R} \lambda_1 U_1^j\right) = V_j^{iT}$$

Using prorated values, Equation (8) can be rewritten as:

$$\sum_{j \in S_i^P} (G^{-1}[\lambda_i U_i^j / v_j^{iT}])U_i^j = T_i \quad (9)$$

$$\Rightarrow \sum_{j \in S_i^P} (G^{-1}[\lambda_i / (v_j^{iT} / U_i^j)])U_i^j = \sum_{j \in S_i^P} (G^{-1}[\lambda_i / v_j^i])U_i^j = T_i \quad (10)$$

where $v_j^i = v_j^{iT}/U_i^j$ is the prorated value (per unit of capacity) of product j on resource i.

Even if a product has a high profit per unit of product, if it has a high usage of a resource then its prorated value (per unit capacity of resource) on the resource is reduced. Thus, the system of equations can be solved iteratively by assuming some initial λ's, prorating the value of each product used by a resource and solving for the new λ until all the λ's converge. The λ's correspond to the Minimum Acceptable Value (MAV) for a resource.

Example of MAV Calculations

FIGS. 2–7 illustrate an example of calculating MAVs of resources of an asset intensive manufacturer. As indicated above, each resource is valued in terms of its usage. In the example of this description, MAVs are calculated as $/unit-capacity with the unit of capacity being one hour. The MAVs may then be used to allocate and value the products made from the resources.

FIG. 2 illustrates a simple model of an asset intensive manufacturer. Products are defined in terms of machine usage, that is, which machines, how much time, and in what order. There are 2 resources (machines) R1 and R2. There are 4 time periods. Because resources are considered different if in different time periods, R1 is represented as R1–R4 and R2 is represented as R5–R8.

Products are different if demanded in different time periods. Thus, for example, P13 is product P1 demanded in time period 3. Resource usage per product is in terms of resources and times. Thus, P1 uses R1 for 2 hours, R5 for 3 hours, and R2 for 5 hours. It can be noted that P3 is the same as P1 in terms of resource usage, in that R6 is the same as R5 but in a different time period, and R3 is the same as R2 but in a different time period. Two resources are not used: R4 and R7. Resource availability specifies how much time is left on each resource.

FIG. 3 illustrates additional problem data for the example of FIG. 2. The cost of making each product, its price, and yield are specified. Typically, the numbers used for these parameters are hypothetical—assuming products are to be made with certain costs, prices, and yields, what is the value of resources used to make the products? Value (profit) is calculated from cost, price, and yield.

Probabilistic demand may be modeled in various ways. An example of a demand distribution is a truncated normal distribution, expressed mathematically as:

$$N_T(\mu, \sigma : x) = N(\mu, \sigma : x)/Q(-\mu/\sigma), x \geq 0$$

where $N(\mu, \sigma : x)$ is a normal distribution with mean, $\mu$, and standard deviation, $\sigma$. $Q(x)$ represents a normal distribution function.

$$N(m, s : x) = 1/\sqrt{2\pi} e^{-((x-\mu)/\sigma)^2/2}, x \in R$$

$$Q(x) = \int_x^\infty N(0, 1 : y) dy$$

A probability density function may be expressed for each product:

$f_1(x) = N_T(15, 5)$
$f_5(x) = N_T(15, 6)$
$f_2(x) = N_T(10, 3)$
$f_6(x) = N_T(10, 3)$
$f_3(x) = N_T(12, 8)$
$f_7(x) = N_T(20, 8)$
$f_4(x) = N_T(15, 3)$
$f_8(x) = N_T(22, 8)$
$f_9(x) = N_T(12, 4)$
$f_{10}(x) = N_T(17, 7)$

The Lagrangian equations formulated above may now be specialized for the demand. Following the above example, the equations are specialized for truncated normal distributions. G(a) is a probability function, as described above in connection with Equation (7).

$$G(a) = \int_a^\infty N_T(\mu, \sigma : x) dx$$

$$= 1/\sqrt{2\pi} Q(-\mu/\sigma)) \int_a^\infty N(\mu, \sigma : x) dx$$

$$= Q((a-\mu)/\sigma)/Q(-\mu/\sigma)$$

Using Equation (7) we get:

$$G(a_j) = Q((a_j - \mu_j)/\sigma_j)/Q(-\mu_j/\sigma_j) = \left(\sum_{l \in S_j^R} \lambda_l U_1^j\right)/v_j \quad (11)$$

$$\Rightarrow Q((a_j - \mu_j)/\sigma_j) = Q(-\mu_j/\sigma_j)\left(\sum_{l \in S_j^R} \lambda_l U_1^j\right)/v_j$$

$$\Rightarrow (a_j - \mu_j)/\sigma_j = Q^{-1}\left[Q(-\mu_j/\sigma_j)\left(\sum_{l \in S_j^R} \lambda_l U_1^j\right)/v_j\right]$$

$$\Rightarrow a_j = \mu_j + \sigma_j Q^{-1}\left[Q(-\mu_j/\sigma_j)\left(\sum_{l \in S_j^R} \lambda_l U_l^j\right)\bigg/v_j\right] \quad (12)$$

From Equation (12):

$$\sum_{l \in S_j^R} \lambda_l U_l^j = v_j Q((a_j - \mu_j)/Q(-\mu_j/\sigma_j) \quad (13)$$

A revenue function is used to calculate expected revenue. Given allocation a, truncated normal demand with mean $\mu$, standard deviation $\sigma$, and value v, what is the revenue R? From Equation (6) set out above, where x is demand for a product:

δR/δx (a)=Pr{$N_T(\mu, \sigma) \geq a$}=v∫$N_T(\mu, \sigma{:}x)$dx=vQ((a-$\mu$)/$\sigma$)/Q(-$\mu$/$\sigma$)

where the limits of integration are from a to ∞. It follows that:

R(a)=∫Q((x-$\mu$)/$\sigma$/Q(-$\mu$/$\sigma$)dx where the limits of integration are from 0 to a. After some manipulation:

R=v$\sigma$[h(a-$\mu$)/$\sigma$)-h(-$\mu$/$\sigma$)]/Q(-$\mu$/$\sigma$)

where h(x)=xQ(x)-1/($2\pi$e$^{-x^*x/2}$)$^{1/2}$.

Each equation is now written in terms of one variable using prorated product prices. The prorated value of a product i on resource j may be expressed as:

$V_i^j = V_i \lambda_j / \Sigma \lambda_l U_l^j$ where $V_i$ is the value of a unit of product i and where $\lambda_j$ is the MAV for the jth resource. The summation is over $l \in S_j^R$, where $S_j^R$ is the set of resources used by product j.

FIG. 4 illustrates a method of setting up and solving the Lagrangian MAV equations. Each of the equations contains one variable, namely the corresponding $\lambda$ for the resource. The system of equations is solved iteratively by assuming initial $\lambda$'s (Step 41), prorating the value of each product used by a resource (Step 42), setting up an equation for each resource where each equation has $\lambda$ as its single variable (step 43), solving each equation for $\lambda$ (step 44), and determining whether the $\lambda$'s are close to the previously picked or calculated $\lambda$'s and whether the residues are small (step 45). The solving step, step 44, may be performed using a binary tree. If it is determined at step 45 that the $\lambda$'s are not close or the residues are not small, the new $\lambda$'s are chosen for the starting point of the next iteration and the process returns to step 42. If the $\lambda$'s are close and the residues are small, then the process ends.

FIG. 5 illustrates the MAV equations, one for each resource. As noted above in connection with FIG. 2, although there are eight resources, two are not used. Thus, there are six MAV equations. Each is a sum of "resource usage terms" (U is a factor) minus an availability term (T is a factor).

FIGS. 6 illustrates the solutions of the MAV equations of FIG. 5. A MAV has been calculated for each of the six resources.

Figures 7, 8A:
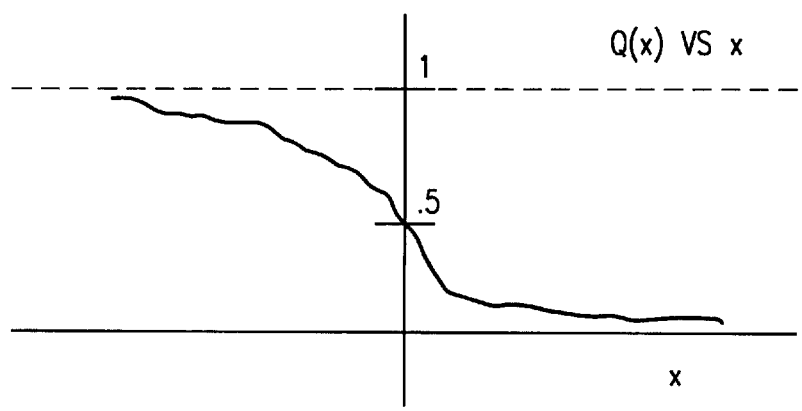

FIG. 7 illustrates allocations and expected revenues for the ten products made with the resources. A determination of whether the allocations are optimal can now be made.

Additional Observations

As indicated above, the MAV calculations provide a MAV for each resource (machine) for each time horizon. The inputs for the MAV calculations include the prices of products made by the resource, probalistic demand for the products, usage of the resource by various products, and availability of the resource. The output may also include a total expected revenue for the available manufacturing capacity by time horizon and by product.

The relationship between MAV and allocation may be specifically expressed mathematically. For a normal distribution, an allocation equation may be expressed as:

$$a_j = \mu_j + \sigma_j Q^{-1}(Q(-\mu_j/\sigma_j)\left(\sum_{l \in S_j^R}\lambda_l U_l^j\right)\bigg/v_j)$$

When $\sum_{l \in S_j^R}\lambda_l U_l^j = v_j$ $a_j = \mu_j + \sigma_j Q^{-1}(Q(-\mu_j/\sigma_j)1)$ $\Rightarrow a_j = \mu_j + \sigma_j Q^{-1}(Q(-\mu_j/\sigma_j))$ $\Rightarrow a_j = \mu_j + \sigma_j(-\mu_j/\sigma_j)$ $\Rightarrow a_j = \mu_j - \mu_j = 0$ If the value of a product is equal to or less than the summation (v;) above, it has zero allocation. In other words, the summation is analogous to consumed opportunity cost and $\lambda$ is the MAV for a resource.

FIGS. 8A and 8B illustrate examples of Q and $Q^{-1}$ functions, respectively, such as those of the equations of FIG. 5.

Integration of MAV Into Larger Planning Systems

FIG. 9 illustrates how a resource valuation engine 91 may be integrated into a larger planning system 90. Engine 91 performs the MAV calculations described above. It accesses a MAV database 92, which stores the model data and other problem data described above. A computer implemented pricing tool 94 or demand forecasting tool 95 may be used to provide price and demand data, respectively.

Once known, MAVs can be used with other control variables, such as ATP (available to promise) variables from ATP tool 96. Allocation data from valuation engine 91 can be used to determine how much of a product is available to promise.

A scheduler 93 may be used in conjunction with MAV calculation engine 91, to receive and process resource values. In this manner, scheduler 93 can be used to provide a manufacturing schedule based on a deterministic demand model.

The output of MAV calculation engine 91 can be further used to negotiate contract prices and due dates for incoming orders, to prioritize orders, and to add capacity using longer term MAVs. Resource values, expected revenue, and allocations can be provided to a master planning engine 20 97, which generates optimal manufacturing scenarios.

Data such as price and allocation may flow both in and out of valuation engine 91. For example, the resource values calculated by engine 91 can be provided to pricing tool 94. In this manner hypotheticals can be formulated, evaluated, and applied.

Other Embodiments

Although the present invention has been described in detail, it should be understood that various changes, substitutions, and alterations can be made hereto without departing from the spirit and scope of the invention as defined by the appended claims.

What is claimed is:

1. A computer-implemented method of valuing resources used in the manufacture of one or more products, comprising:
   modeling the manufacturing process in terms of at least one time period, at least one resource, and one or more products;
   providing a usage value for each product per resource;
   providing an availability value for each resource;
   providing a profit value for each product;
   providing an allocation value for each product;
   generating a demand function for the products;
   generating a value equation for each resource based on the usage value, the availability value, the profit value, the allocation value, and the demand function;
   solving the value equations to determine a resource value for each resource using a Lagrangian process, each equation being expressed with a multiplier that represents the resource value for the corresponding resource; and
   making the resource values available for use in connection with a manufacturing process.

2. The method of claim 1, wherein the demand function is based on a truncated normal distribution.

3. The method of claim 1, wherein the profit values are prorated for each product on each resource.

4. The method of claim 1, further comprising: generating a revenue function for each product based on the allocation value, the profit value, and the demand function; and solving the revenue function for expected revenue of the product.

5. The method of claim 1, wherein solving comprises iteratively setting initial values of the Lagrange multiplier and converging to new Lagrange multiplier values.

6. The method of claim 1, wherein solving is performed using a binary tree.

7. The method of claim 1, further comprising providing the resource values to a scheduling engine.

8. The method of claim 1, wherein solving comprises formulating a set of Lagrange equations from the value equations, each Lagrange equation having a multiplier as the single unknown variable.

9. The method of claim 8, wherein each Lagrangian equation is a sum of terms, each term associated with a usage value minus the availability value.

10. A computer-implemented system for valuing resources used in the manufacture of one or more products, comprising:
    memory that stores a model of the manufacturing process in terms of at least one time period, at least one resource, and one or more products;
    memory that stores a usage value for each product per resource, an availability value for each resource, a profit value for each product, and an allocation value for each product;
    a process for generating a demand function for the products; and
    a valuation engine for generating a value equation for each resource based on the usage value, the availability value, the profit value, the allocation value, and the demand function, the valuation engine operable to:
    solve the value equations to determine a resource value for each resource using a Lagrangian process, each equation being expressed with a multiplier that represents the resource value for the corresponding resource; and
    make the resource values available for use in connection with a manufacturing process.

11. The system of claim 10, further comprising a demand forecast tool for providing demand data to the valuation engine.

12. The system of claim 10, further comprising a pricing tool for providing product price data to the valuation engine.

13. The system of claim 10, wherein the valuation engine further calculates expected revenue, using the allocation values, the profit values, and the demand function.

14. The system of claim 10, further comprising a scheduling engine for generating manufacturing schedules based on the resource values.

15. The system of claim 10, further comprising a master planning engine for determining product prices based on the resource values.

16. A computer-implemented method of valuing a resource used in the manufacture of one or more products, comprising:
    modeling the manufacturing process in terms of at least one time period, the resource, and one or more products to be manufactured using the resource;
    generating a value equation for the resource based on information concerning usage of the resource by the products, information concerning the availability of the resource, information concerning profits associated with the products, information concerning allocation of the products, and one or more demand functions associated with the products, the value equation including a multiplier that represents a resource value of the resource;
    solving the value equation to determine the resource value; and
    making the resource value available for use in connection with a manufacturing process.

17. The method of claim 16, wherein the demand function is based on a truncated normal distribution.

18. The method of claim 16, wherein the information concerning profits associated with the products comprises profit values that are prorated for each product for the resource.

19. The method of claim 16, further comprising:
    generating a revenue function for each product based on the allocation information, the profit information, and the demand function; and
    solving the revenue function for expected revenue of the product.

20. The method of claim 16, wherein solving is performed using a binary tree.

21. The method of claim 16, further comprising providing the resource value to a scheduling, engine.

22. The method of claim 16, wherein the value equation is solved using a Lagrangian process.

23. The method of claim 22, wherein solving comprises iteratively setting an initial value of a Lagrange multiplier and converging to a new Lagrange multiplier value.

24. A computer-implemented system for valuing a resources used in the manufacture of one or more products, comprising:
    a process operable to generate a demand function for one or more products; and
    a valuation engine operable to:
    generate a value equation for the resource based on information concerning usage of the resource by the products, information concerning the availability of the resource, information concerning profits associated with the products, information concerning allocation of the products, and one or more demand functions associated with the products, the value equation including a multiplier that represents a value of the resource;

solve the value equation to determine the resource value; and make the resource value available for use in connection with a manufacturing process.

25. The system of claim 24, wherein the valuation engine solves the value equation using, a Lagrangian process.

26. The system of claim 24, further comprising a demand forecast tool for providing demand data to the valuation engine.

27. The system of claim 24, further comprising a pricing tool for providing product price data to the valuation engine.

28. The system of claim 24, wherein the valuation engine further calculates expected revenue, using, the allocation information, the profit information, and the demand function.

29. The system of claim 24, further comprising, a scheduling engine for generating manufacturing schedules based on the values of the resources.

30. The system of claim 24, further comprising a master planning engine for determining, product prices based on the values of the resources.

31. Resource valuation software embodied on a computer-readable medium and, when executed by a computer, operable to:

generate a value equation for a resource based on information concerning usage of the resource in the manufacture of one or more products, information concerning the availability of the resource, information concerning profits associated with the products, information concerning allocation of the products, and one or more demand functions associated with the products, the value equation including a multiplier that represents a value of the resource; and solve the value equation to determine the value of the resource.

* * * * *